(12) United States Patent
Udriste et al.

(10) Patent No.: US 10,913,535 B2
(45) Date of Patent: Feb. 9, 2021

(54) CUSHION ASSEMBLY WITH ELASTOMERIC LATTICE INSERT

(71) Applicant: B/E Aerospace, Inc., Winston-Salem, NC (US)

(72) Inventors: Daniel I. Udriste, Winston-Salem, NC (US); Stephen A. Puglisi, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/252,891

(22) Filed: Jan. 21, 2019

(65) Prior Publication Data
US 2020/0231285 A1 Jul. 23, 2020

(51) Int. Cl.
*B64D 11/06* (2006.01)
*A47C 7/18* (2006.01)
*A47C 7/74* (2006.01)
*B60N 2/56* (2006.01)
*A47C 7/35* (2006.01)

(52) U.S. Cl.
CPC ........... *B64D 11/0647* (2014.12); *A47C 7/18* (2013.01); *A47C 7/35* (2013.01); *A47C 7/746* (2013.01); *B60N 2/5642* (2013.01); *B64D 11/0626* (2014.12); *B64D 11/0649* (2014.12)

(58) Field of Classification Search
CPC ........... B64D 11/0626; B64D 11/0647; B64D 11/0649; A47C 7/18; A47C 7/35; A47C 7/74; A47C 7/742; A47C 7/744; A47C 7/746; A47C 7/748; B60N 2/56; B60N 2/5621; B60N 2/5628; B60N 2/5642; B60N 2/646
See application file for complete search history.

(56) References Cited

U.S. PATENT DOCUMENTS 9,456,702 B2 * 10/2016 Miyata ................. A47C 27/125
10,517,405 B2 * 12/2019 Katsuura ................ A47C 7/744
10,538,187 B2 * 1/2020 Takanohashi ............ B60N 2/70
(Continued)

FOREIGN PATENT DOCUMENTS

| CA | 2940929 A1 * | 3/2017 | ........... B60N 2/5678 |
| EP | 2423040 A2 * | 2/2012 | ........... B60N 2/5657 |

(Continued)

OTHER PUBLICATIONS

Office Action dated May 29, 2020 for EP Application No. 19211103.

*Primary Examiner* — Ryan D Kwiecinski
(74) *Attorney, Agent, or Firm* — Suiter Swantz pc llo

(57) ABSTRACT

A cushion assembly such as an aircraft passenger seat cushion assembly including a solid foam component and an elastomeric lattice insert disposed in a void in the solid foam component, the elastomeric lattice insert having a compression profile that mimics a predetermined compression profile of a solid foam. The elastomeric lattice insert including repeating like cuboid structures such as interconnected repeating face-centered cube structures, interconnected repeating body-centered cube structures, or interconnected repeating kagome structures. The elastomeric lattice insert may be in thermal communication with an air conditioning system for delivering conditioned air through the elastomeric lattice insert.

9 Claims, 12 Drawing Sheets

(56) References Cited

U.S. PATENT DOCUMENTS

| | | | |
|---|---|---|---|
| 2009/0033130 A1 | 2/2009 | Marquette et al. | |
| 2013/0167556 A1* | 7/2013 | Jun | F25B 21/04 |
| | | | 62/3.61 |
| 2015/0158405 A1 | 6/2015 | Miyata et al. | |
| 2016/0096460 A1* | 4/2016 | Storgato | B60N 2/5621 |
| | | | 297/180.13 |
| 2016/0325520 A1* | 11/2016 | Berger | B33Y 80/00 |
| 2017/0043695 A1* | 2/2017 | Kitamoto | B68G 7/054 |
| 2017/0164746 A1* | 6/2017 | Phillips | A47C 7/029 |
| 2017/0181225 A1 | 6/2017 | Inaba et al. | |
| 2018/0043805 A1* | 2/2018 | Baek | B60N 2/5642 |
| 2019/0160989 A1* | 5/2019 | Pardue | B33Y 80/00 |
| 2019/0375324 A1* | 12/2019 | Subat | B60R 11/0217 |
| 2019/0387896 A1* | 12/2019 | Lisenbee | A47C 7/18 |
| 2020/0010197 A1* | 1/2020 | Otovic | B64D 11/0607 |
| 2020/0086996 A1* | 3/2020 | La Montagna | B60N 2/56 |

FOREIGN PATENT DOCUMENTS

| | | | | |
|---|---|---|---|---|
| WO | WO-2014037909 A1 * | 3/2014 | | B64D 11/0647 |
| WO | WO-2015105859 A1 * | 7/2015 | | B32B 15/04 |
| WO | WO-2016002491 A1 * | 1/2016 | | B29C 39/24 |
| WO | WO-2017110529 A1 * | 6/2017 | | B60N 2/5642 |
| WO | 2018226200 A1 | 12/2018 | | |
| WO | WO-2019245075 A1 * | 12/2019 | | A61G 5/10 |

\* cited by examiner

CUSHION ASSEMBLY WITH ELASTOMERIC LATTICE INSERT

BACKGROUND

Solid foams are included in aircraft seat cushions and other cushion assemblies for comfort, and in some cases also for flotation. Different solid foam types may have different physical properties including, but not limited to, durometer, cell density and load deflection. Solid foams may be cut, stacked, adhered together and further formed to suit specific purposes within an aircraft seat cushion assembly or other structure.

Solid foam types, thicknesses and stacked arrangements are selected to achieve a desired compression profile, also referred to as an Indentation Load Deflection (ILD) profile. Such foam arrangements may include an outermost (e.g. uppermost) foam layer for comfort that is resiliently deformable having a high degree of compressibility and spring rate (e.g. open cell foam). The outermost foam layer may be stacked on and adhered to one or more inner foam layers. Inner foam layers (e.g. closed cell foam) may be more rigid and less deformable as compared to the outermost layer to provide support to the overall foam layer stack. The inner foam layer together with the outermost foam layer contributes to the desired compression profile, or ILD profile, of the cushion assembly.

While solid foams are adequate for comfort and resiliency, they typically suffer from poor breathability and heat transfer properties. As such, solid foams are not easily vented and tend to hold heat upon prolonged use, leading to passenger discomfort.

Accordingly, what is needed is a cushion assembly and a cushion assembly component having comfort and resiliency properties substantially equal to solid foams, while also having improved breathability and heat transfer properties as compared to solid foams. Such component may be strategically placed within a cushion assembly where breathability and heat transfer are most needed.

BRIEF SUMMARY OF THE INVENTIVE ASPECTS

In one aspect, an embodiment of the inventive concepts disclosed herein is directed to a cushion assembly including a solid foam component including at least one of open cell foam and closed cell foam, and an elastomeric lattice insert disposed in a void or recess in the solid foam component. The elastomeric lattice insert may have a unit cuboid structure configured to mimic a pre-determined compression profile of a predetermined solid foam.

In some embodiments, the elastomeric lattice insert may include a plurality of stacked and interconnected repeating ones of the cuboid structures.

In some embodiments, each of the cuboid structures may have a unit cell length from about 0.4 cm to about 1.15 cm.

In some embodiments, each of the cuboid structures may be alike and may be one of a face-centered cube structure, body-centered cube structure and kagome structure.

In some embodiments, the elastomeric lattice insert may be made from a polyurethane resin.

In some embodiments, the void or recess in the solid foam component may be positioned at or near an outer surface of the solid foam component. In some embodiments, the void or recess in the solid foam component may be a tunnel through the solid foam component having a first end open to a first surface of the solid foam component and a second end open to a second surface of the solid foam component.

In some embodiments, at least a portion of the elastomeric lattice insert may be disposed in a load-bearing region of the solid foam component.

In some embodiments, the cushion assembly may include a plurality of elastomeric lattice inserts each disposed in a dedicated void or recess formed in the solid foam component, and at least a portion of one of the plurality of elastomeric lattice inserts is disposed in a load-bearing region of the solid foam component.

In some embodiments, the cushion assembly may be part of one of an aircraft seat component, a partition, a monument or an ottoman.

In another aspect, an embodiment of the inventive concepts disclosed herein is directed to an aircraft passenger seat cushion assembly including a solid foam component including at least one of open cell foam and closed cell foam, and an elastomeric lattice insert disposed in a void formed in the solid foam component, the elastomeric lattice insert having a unit cuboid structure configured to mimic a predetermined compression profile of a predetermined solid foam.

In some embodiments, the elastomeric lattice insert may include a plurality of stacked and interconnected repeating ones of cuboid structures, with each cuboid structure having a unit cell length from about 0.4 cm to about 1.15 cm.

In some embodiments, the elastomeric lattice insert may include a plurality of stacked and interconnected repeating ones of cuboid structures, with each cuboid structure being one of a face-centered cube structure, a body-centered cube structure and a kagome structure.

In some embodiments, at least a portion of the elastomeric lattice insert may be positioned in a load bearing region of the solid foam component.

In some embodiments, the aircraft passenger seat cushion assembly may include a plurality of elastomeric lattice inserts each disposed in a dedicated recess, wherein at least a portion of at least one of the plurality of the elastomeric lattice inserts is disposed in a load-bearing region of the solid foam component.

In yet another aspect, an embodiment of the inventive concepts disclosed herein is directed to an aircraft passenger seat cushion system including a seat cushion assembly and an air conditioning system, wherein the seat cushion assembly includes a solid foam component and an elastomeric lattice insert disposed in a void or recess formed in a load-bearing region of the solid foam component, the elastomeric lattice insert having a unit cuboid structure configured to mimic a predetermined compression profile of a solid foam, and the air conditioning system being in thermal communication with the elastomeric lattice insert and operable for delivering conditioned air through the elastomeric lattice insert.

In some embodiments, the air conditioning system may be operable for supplying heated or cooled air through the elastomeric lattice insert, and may include a duct in fluid communication with the elastomeric lattice insert operable for directing conditioned air through the elastomeric lattice insert, and a fan for supplying conditioned air to the duct.

In some embodiments, the air conditioning system may further include a temperature sensor disposed in proximity to the elastomeric lattice insert operable for sensing air temperature in an interior portion of the seat cushion assembly, and in response to the sensed air temperature, activating the air conditioning system to deliver conditioned air.

In some embodiments, the air conditioning system may further include a controller in communication with the temperature sensor, the fan and at least one of a heater and a cooler, the controller configured to receive the sensed air temperature from the sensor and determine whether the conditioned air should be heated or cooled, and the controller further operable for activating the heater or cooler and the fan to deliver the conditioned air through the elastomeric lattice insert.

Embodiments of the inventive aspects may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
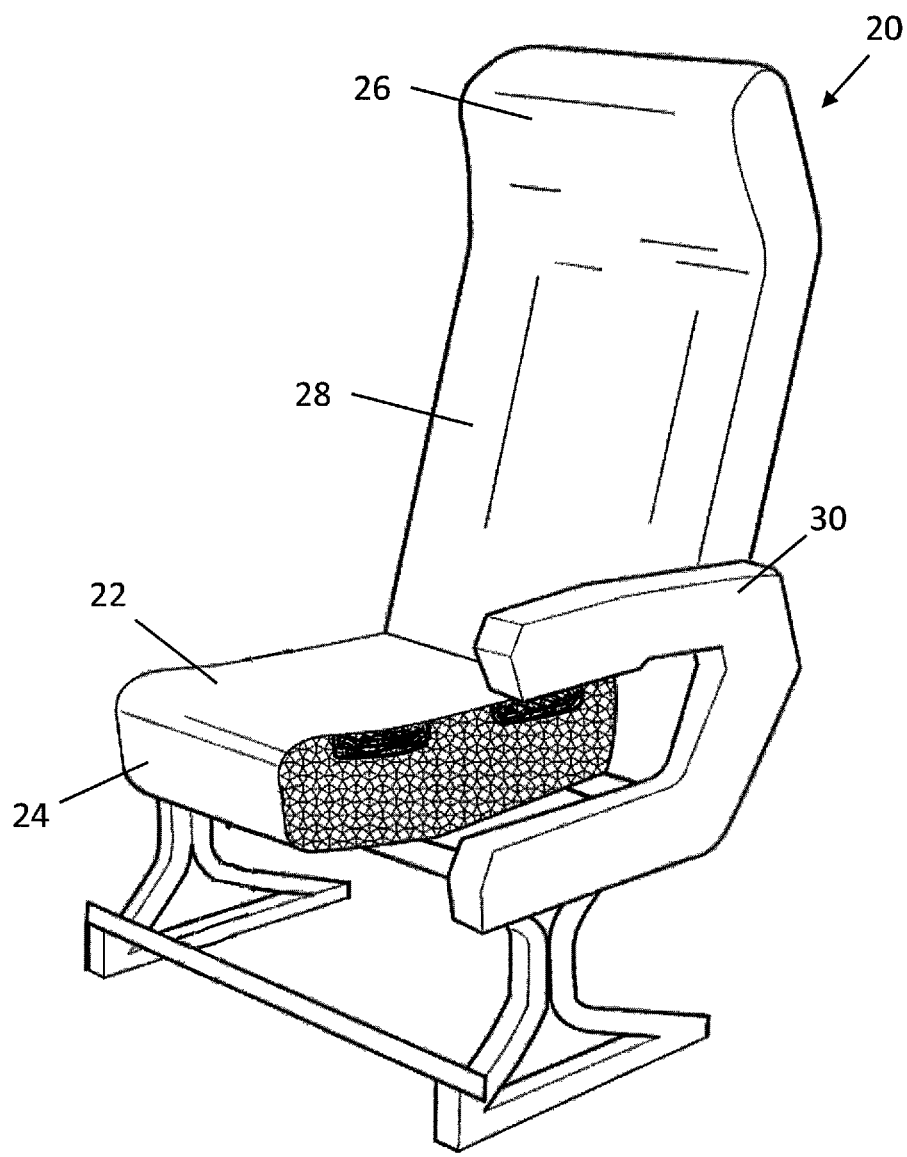
FIG. 1 is a perspective view of an exemplary aircraft passenger seat including a seat cushion assembly in accordance with an embodiment of the present disclosure.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, the inventive concepts disclosed herein are generally directed to cushion assemblies, aircraft passenger seat cushion assemblies, and aircraft passenger seat cushion systems including conditioned air delivery systems. Each of the cushion assemblies disclosed herein include a solid foam component and at least one elastomeric lattice insert disposed in a portion of the solid foam component, the elastomeric lattice insert structured to substantially mimic the compression performance of the solid foam component with improved breathability and heat transfer properties as compared to that of the solid foam component. In some applications, conditioned air may be supplied through the at least one elastomeric lattice insert to enhance comfort for an aircraft passenger.

The elastomeric lattice insert may have a cuboid structure constructed to mimic a predetermined compression profile of a solid foam, such as the solid foam in surrounding relation to the elastomeric lattice insert or another solid foam. In some embodiments, the elastomeric lattice insert can be configured to match the compression profile of the solid foam component in which the elastomeric lattice is contained. In this regard, the passenger experiences the same compression profile in a seat cushion assembly whether the entire cushion assembly is solid foam or includes an elastomeric lattice insert disposed in a portion of the solid foam component. In other embodiments, the elastomeric lattice insert may have a unit cuboid structure configured to mimic a pre-determined compression profile of a solid foam different from the surrounding solid foam component of the cushion assembly, for example, to provide greater or lesser compression in the region of the elastomeric lattice insert as compared to the surrounding solid foam.

In some embodiments, the cushion assembly may be a component of an aircraft passenger seat. For example, the cushion assembly may part a seat bottom, seat back, arm rest, leg rest, head rest, ottoman, etc. In some embodiments, the cushion assembly may be a component of a partition. In some embodiments, the cushion assembly may be part of a monument.

Referring now to the drawing figures, FIG. 1 shows a non-limiting example of an aircraft passenger seat 20 including a cushion assembly 22 realized as a seat bottom cushion assembly 24. In other embodiments, a cushion assembly including an elastomeric lattice insert according to the present disclosure could be incorporated into one or more of the head rest cushion 26, seat back cushion 28, arm rest cushion 30, or part of a leg rest or ottoman (not shown). In some embodiments, more than one of the aircraft passenger seat cushions may include a cushion assembly including at least one elastomeric lattice insert.

Figure 2:
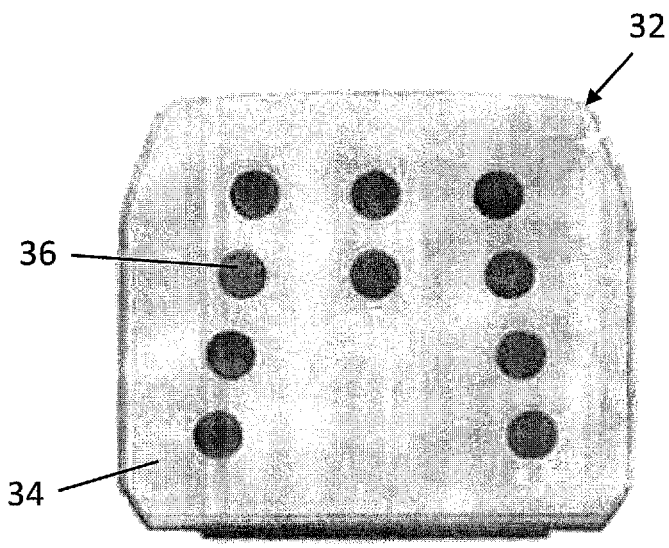
FIG. 2 is a top plan view of a seat bottom cushion assembly in accordance with an embodiment of the present disclosure.
Figure 3:
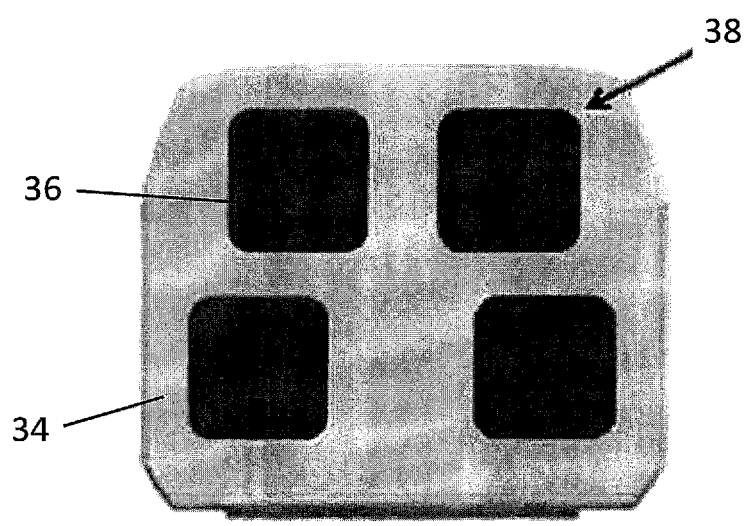
FIG. 3 is a top plan view of another seat bottom cushion assembly in accordance with an embodiment of the present disclosure.

FIGS. 2-3 show non-limiting examples of seat bottom cushion assemblies 32 and 38 according to embodiments of the present disclosure. FIG. 2 shows a top view of a seat bottom cushion assembly 32 including a solid foam component 34, for example open cell foam, and a plurality of elastomeric lattice inserts 36. In any of the embodiments disclosed herein, the cushion assemblies may include, for example, open cell foam positioned at least at the top surface of the cushion for comfort, and optionally closed cell foam at depth in the cushion for flotation. The elastomeric lattice inserts 36 are generally concentrated in the region or portion of the cushion assembly subject to the highest load-bearing demands when a passenger is seated. With the elastomeric lattice inserts 36 concentrated near the back and sides of the seat bottom cushion assembly 32, the elastomeric lattice inserts 36 are located proximate to support a seated passenger's backside and legs in the primary load-bearing regions of the cushion.

FIG. 3 shows a top view of the other cushion assembly 38. The cushion assembly includes a solid foam component 34, for example open cell foam, and plurality of elastomeric lattice inserts 36. Cushion assemblies 32 and 38 each include a plurality of elastomeric lattice inserts 36 disposed in a plurality of voids or recesses formed in the solid foam component with the plurality of elastomeric lattice inserts 36 disposed in load-bearing regions of the solid foam component 34. Comparing the cushion assemblies 32 and 38 in FIGS. 2-3, the second cushion assembly 38 has fewer, but larger elastomeric lattice inserts 36 as compared to the first cushion assembly 32. In some embodiments containing a plurality of elastomeric lattice inserts, at least a portion of at least one of the plurality of elastomeric lattice inserts is disposed in the load bearing portion of the solid foam component. This allows the passenger to experience the breathability of the elastomeric lattice inserts for increased comfort relative to traditional solid foam seats including only solid foam(s).

Figure 4:
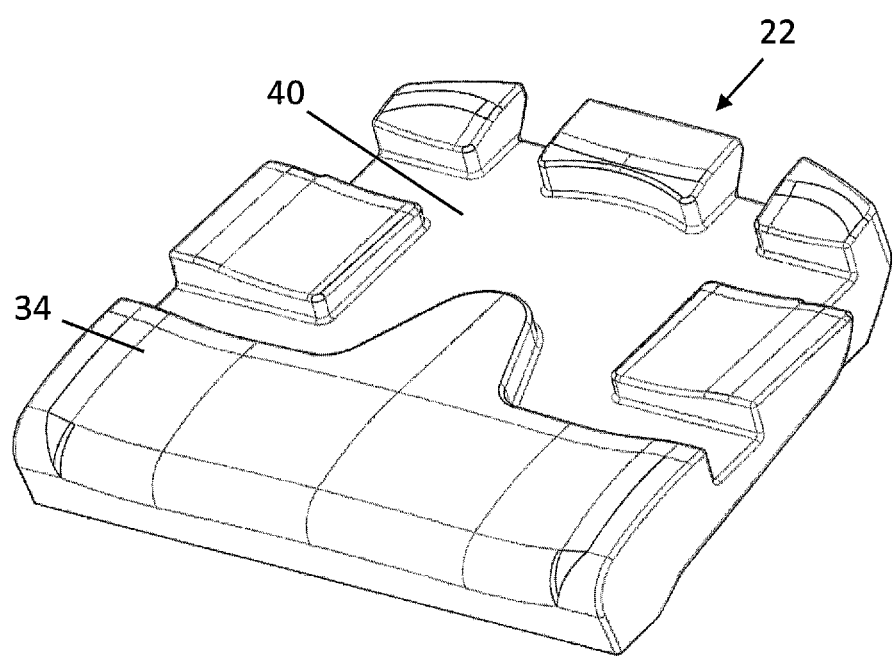
FIG. 4 is a perspective view of another seat bottom cushion assembly showing a solid foam component having a void or recess formed in the solid foam component for receiving at least one elastomeric lattice insert.
Figure 5:
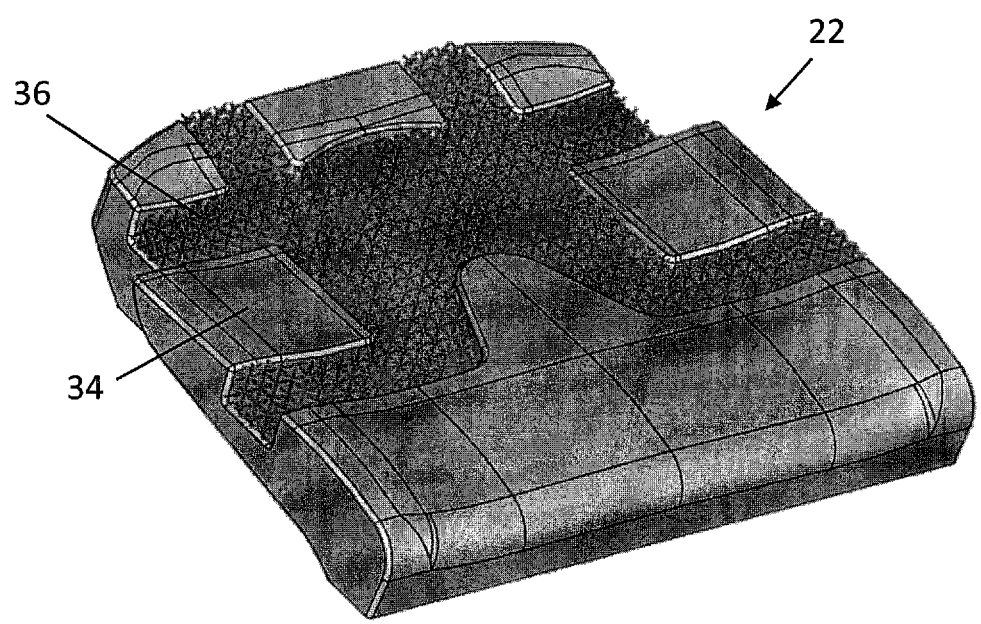
FIG. 5 is a perspective view of the seat bottom cushion assembly of FIG. 4 shown with an elastomeric lattice insert disposed in the void formed in the solid foam component.
Figure 6:
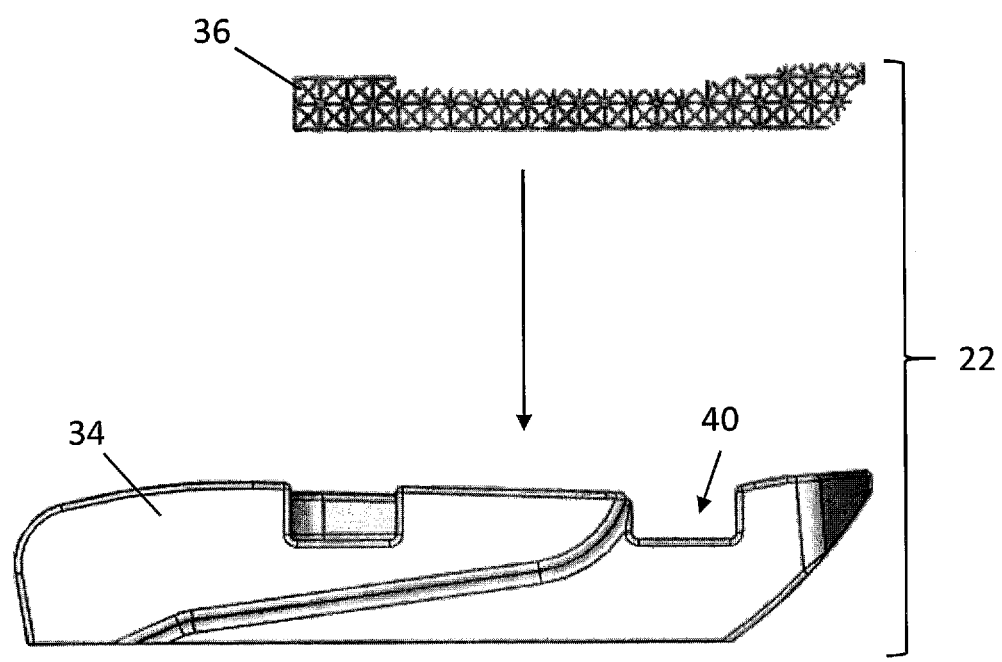
FIG. 6 is an exploded side view of the seat bottom cushion assembly of FIG. 5.

FIGS. 4-6 show another non-limiting example of a seat bottom cushion assembly 22 also shown as part of the aircraft passenger seat 20 shown in FIG. 1. FIG. 4 shows a perspective view of the solid foam component 34 having the recess or void 40 formed therein for receiving the elastomeric lattice insert. FIG. 5 shows a perspective view of the seat bottom cushion assembly 22 including the elastomeric lattice insert 36 disposed in the void 40 formed in the solid foam component 34. FIG. 6 shows an exploded side view of the seat bottom cushion assembly 22, showing the elastomeric lattice insert 36 removed from the solid foam component 34. In the non-limiting example of FIGS. 4-6, the recess or void 40 is positioned in the top surface of the solid foam component 34 and is shaped as one continuous recess occupying the primary load-bearing regions of the cushion assembly and extending to the lateral extent of the sides and the back for venting.

In some embodiments, the void formed in the solid foam component may be a tunnel through the solid foam component having a first end open on a first surface of the solid foam component and a second end open on a second surface of the solid foam component, for example, the top and bottom, opposing sides, the top or bottom and one side, front and back, front or back and one side, etc. In some embodiments, the first surface and the second surface are the same, for example, the first opening and the second opening are on the top of the cushion assembly or on the same side of the cushion assembly. In some embodiments, the first surface and the second surface are not the same, for example, the first surface is the top surface and the second surface is a side surface of the cushion assembly.

Figure 7:
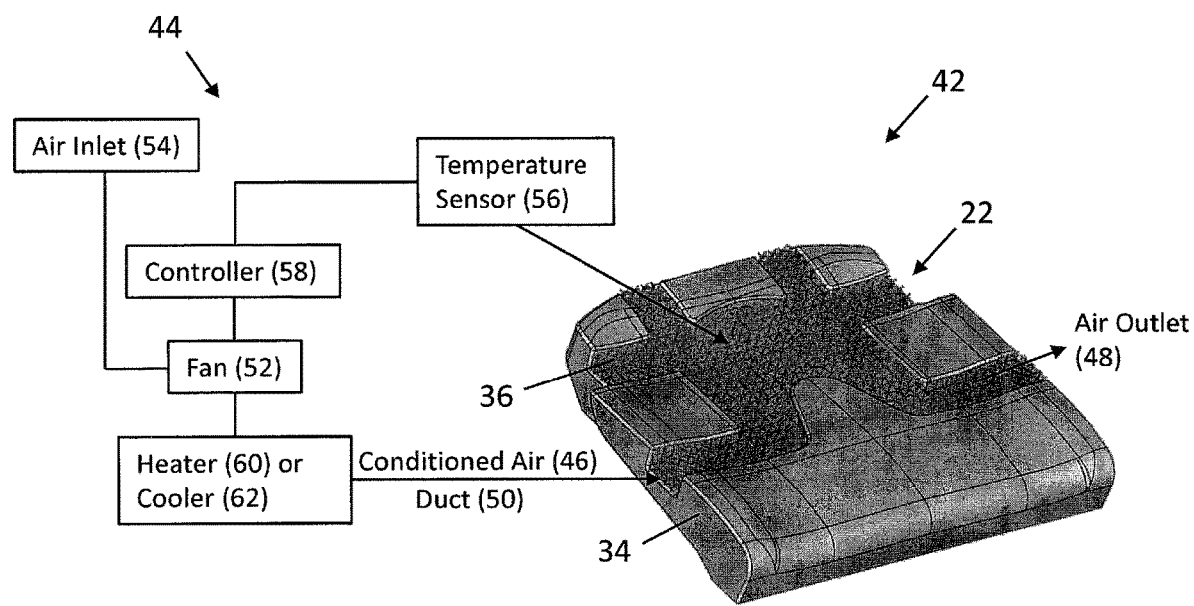
FIG. 7 is a schematic diagram of an aircraft passenger seat cushion system comprising the seat cushion assembly of FIG. 5 and an air conditioning system.

In some embodiments, the seat cushion assemblies 22, 32, 38 of FIGS. 1-6 are an element of an aircraft passenger seat cushion system. Referring to FIG. 7, a non-limiting example of an aircraft passenger seat cushion system 42 includes at least one seat cushion assembly according to any embodiment disclosed herein (e.g. cushion assembly 22) in thermal communication with an air conditioning system 44. The air conditioning system 44 is in thermal communication with the elastomeric lattice insert 36 and is operable for delivering to or directing conditioned air 46 through the elastomeric lattice insert 36. In a non-limiting example, the seat cushion assembly 22 can be covered with fabric (not shown) that may influence the path of air through the elastomeric lattice insert 36. For example, if the fabric cover (not shown) has low permeability to air on top of the seat cushion assembly 22, and high permeability to air on the side of seat cushion assembly 22, then the predominant path of air through the elastomeric lattice insert 36 can result in an air outlet 48 through the side of seat cushion assembly 22.

In some embodiments, the air conditioning system 44 includes a duct 50 in fluid communication with the elastomeric lattice insert 36 and a fan 52 for moving conditioned air 46 through the elastomeric lattice insert. In some embodiments, the fan 52 may draw air from the general surroundings of the fan 52 and into an air inlet 54. In some embodiments, the air conditioning system 44 further includes a temperature sensor 56. The temperature sensor 56 may be disposed within or in proximity to the elastomeric lattice insert 36 and is operable for sensing air temperature near or within an interior portion of seat cushion assembly 22, for example, within the interior of the elastomeric lattice insert 36. In response to the sensed air temperature, the air conditioning system 44 may be activated to deliver conditioned air 46, either heated or cooled air, depending on the sensed temperature. In some embodiments, the air conditioning system 44 further comprises at least one of a controller 58, a heater 60, and a cooler 62. The controller 58 is in communication with the temperature sensor 56, and additionally the fan 52, heater 60 and cooler 62 if present. The controller 58 is configured to receive the sensed air temperature from the temperature sensor 56, and in response determine the temperature setting of the conditioned air to be delivered to adjust the sensed temperature to a desired temperature, for example, determined by the seat occupant. In some embodiments, the controller 58 activates the air conditioning system 44 to operate the heater 60 or cooler 62 and the fan 52 to deliver the conditioned air 46 via the duct 50 and through elastomeric lattice insert 36.

The manner and logic in which the controller 58 operates is not limiting. In one non-limiting example, a seat occupant may simply request heated or cooled air by selecting the temperature or level setting on the controller. The controller 58 may further include a fan speed setting, providing the seat occupant the ability to set the amount of air flow. In another non-limiting example, the controller may receive a desired air temperature setting for air within the interior portion of seat cushion assembly 22. The desired air temperature setting may be set by the carrier, flight crew or seat occupant. In some embodiments, the air conditioning system may draw and condition the air. In other embodiments, the air conditioning system may draw conditioned air from a separate system outside of the seat air conditioning system. In other embodiments, the air conditioning may lack a heater and/or cooler and may include a fan to move air through the cushion assembly.

Benefits of the aircraft seat cushion system including a seat cushion assembly and air conditioning system include enhanced comfort for the seat occupant. Foam is not breathable and can become uncomfortable to passengers, especially where their body contacts the seat cushion assembly in the load bearing regions. The aircraft seat cushion system combines the breathability of the elastomeric lattice inserts with conditioned air flowing therethrough, thus the seat occupant can feel heating or cooling for comfort, especially on long flights.

In another embodiment, the air conditioning system can be combined with a cushion assembly for use in a partition, monument or ottoman. In one embodiment, the air conditioning system may be used to cool a monument containing heat-generating electrical equipment.

The elastomeric lattice inserts disclosed herein advantageously mimic or achieve compression profiles of conventional solid foams (e.g., open-celled foams) while concurrently avoiding the disadvantages commonly associated with conventional solid foams (e.g., lack of breathability and poor heat transfer capacity, etc.). The elastomeric lattice inserts of the present disclosure may be made by additive manufacturing processes (e.g., 3D printing).

Figure 8:
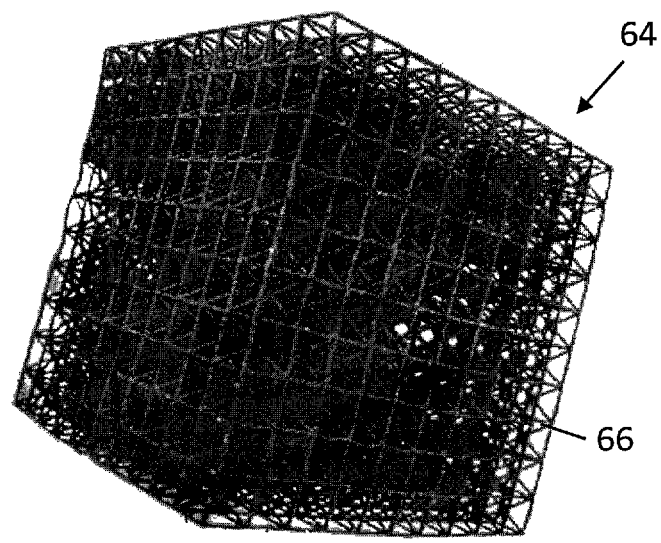
FIG. 8 is a perspective view of an elastomeric lattice structure including a plurality of stacked and interconnected repeating body-centered cube (BCC) structures.
Figure 9:
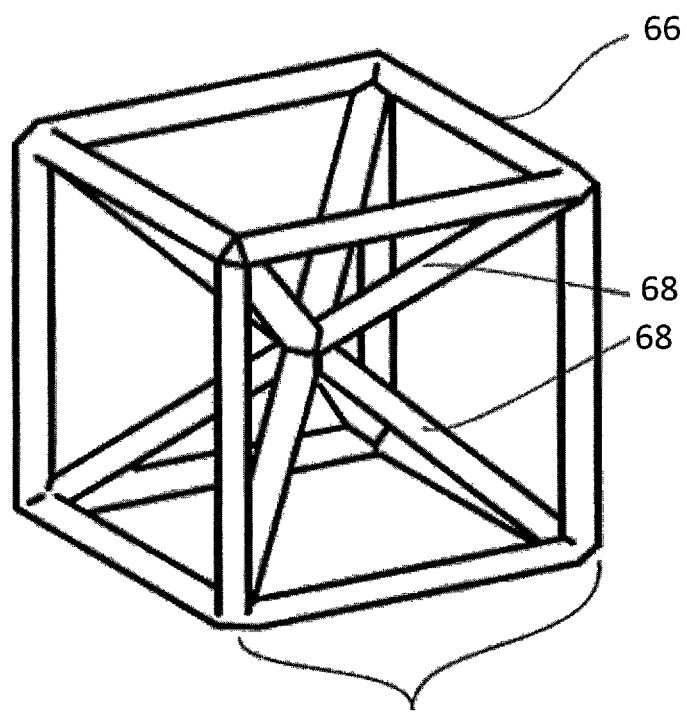
FIG. 9 is a perspective view of a single body-centered cube (BCC) structure.
Figure 10:
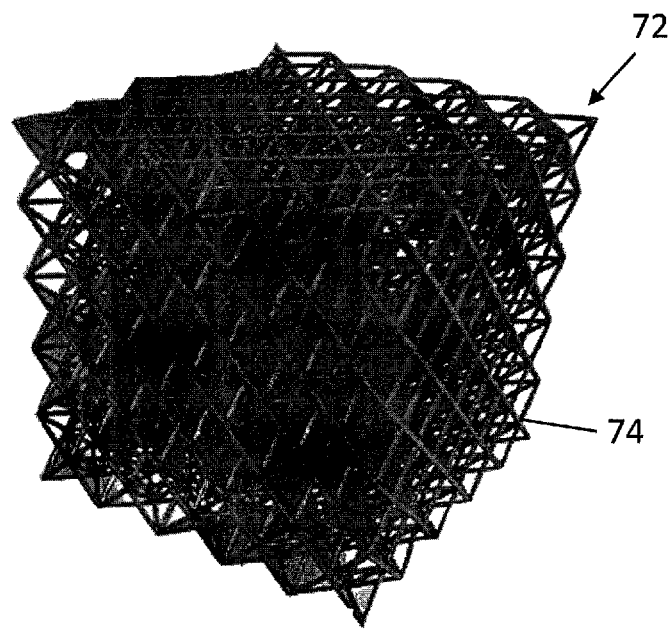
FIG. 10 is a perspective view of a lattice structure including a plurality of stacked and interconnected repeating face-centered cube (FCC) structures.
Figure 11:
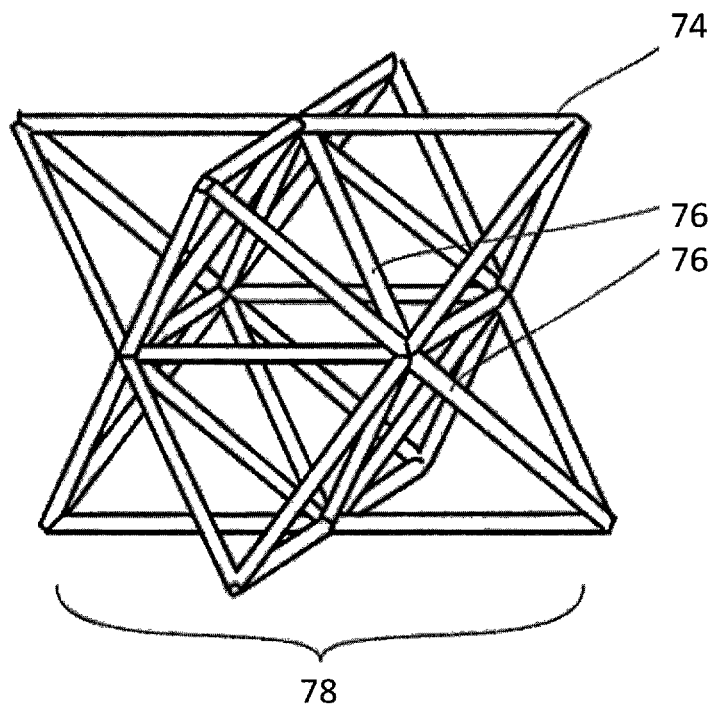
FIG. 11 is a perspective view of a single face-centered cube (FCC) structure.
Figure 12:
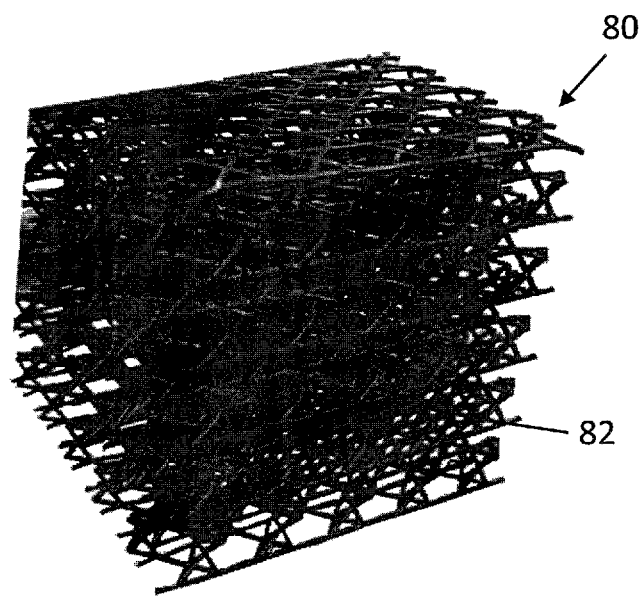
FIG. 12 is a perspective view of a lattice structure including a plurality of stacked and interconnected repeating kagome structures.
Figure 13:
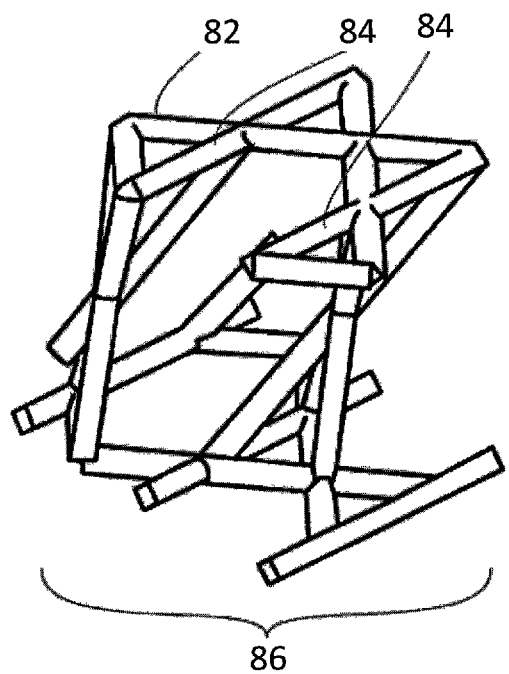
FIG. 13 is a perspective view of a single kagome structure.

Non-limiting examples of additive-manufactured elastomeric lattices are shown in FIGS. 8-13. FIG. 8 shows an additive-manufactured elastomeric lattice 64 having a unit cuboid structure 66 configured to achieve a predetermined compression profile of a predetermined solid foam. The elastomeric lattice 64 includes a plurality of stacked and interconnected repeating cuboid structures 66. FIG. 9 shows a single cuboid structure 66 of the lattice 64 of FIG. 8 in the form of a body-centered cube structure (BCC). The cuboid structure 66 includes a cage and a plurality of interconnected struts 68 and has a predetermined unit cell length 70. FIG. 10 shows an additive-manufactured elastomeric lattice 72 having a unit cuboid structure 74 configured to achieve a predetermined compression profile of a predetermined solid foam. The elastomeric lattice 72 includes a plurality of stacked and interconnected repeating cuboid structures 74. FIG. 11 shows a single cuboid structure 74 of the lattice 72 of FIG. 10 in the form of a face-centered cube structure (FCC). The cuboid structure 74 includes a cage and a plurality of interconnected struts 76 and has a unit cell length 78. FIG. 12 shows yet another additive-manufactured elastomeric lattice 80 having a unit cuboid structure 82 configured to achieve a predetermined compression profile of a predetermined solid foam. The elastomeric lattice 80 includes a plurality of stacked and interconnected repeating cuboid structures 82. FIG. 13 shows a single cuboid structure 82 of the lattice 80 of FIG. 12 in the form of a kagome structure. The cuboid structure 82 includes a plurality of interconnected struts 84 and has unit cell length 86.

The above-described elastomeric lattices 64, 72, 80 have a lighter weight, greater breathability, and greater heat transfer capacity as compared to a conventional solid foam stack of equal size. The elastomeric lattices 64, 72, 80 are constructed from a plurality of stacked and interconnected repeating cuboid structures 66, 74, 82, respectively. In non-limiting examples, each of the interconnecting struts and cage members of the cuboid structures may have a diameter from about 0.04 cm to about 0.09 cm, and each individual cube unit cell length may range from about 0.4 cm to about 1.15 cm, thereby dimensionally defining the cube and providing the resiliently deformable characteristics and/or resistance to permanent deformation of the lattices formed from these cuboid structures.

Design factors such as material selection, unit cell length, strut thickness, strut shape, etc. can be manipulated to achieve or mimic compression characteristics of solids foams to achieve a predetermined compression profile. For example, varying the unit cell length and/or varying strut diameter may increases or decreases rigidity of the cuboid structure. Furthermore, materials such as cured polyurethane resins may be used to provide rigidity and elasticity comparable to the performance of solid foams under loading, and performance may be modified by altering cure times and/or chemical components (e.g., altering ratios of hydroxyl groups to isocyanate groups) in the polyurethane resin.

Figure 14:
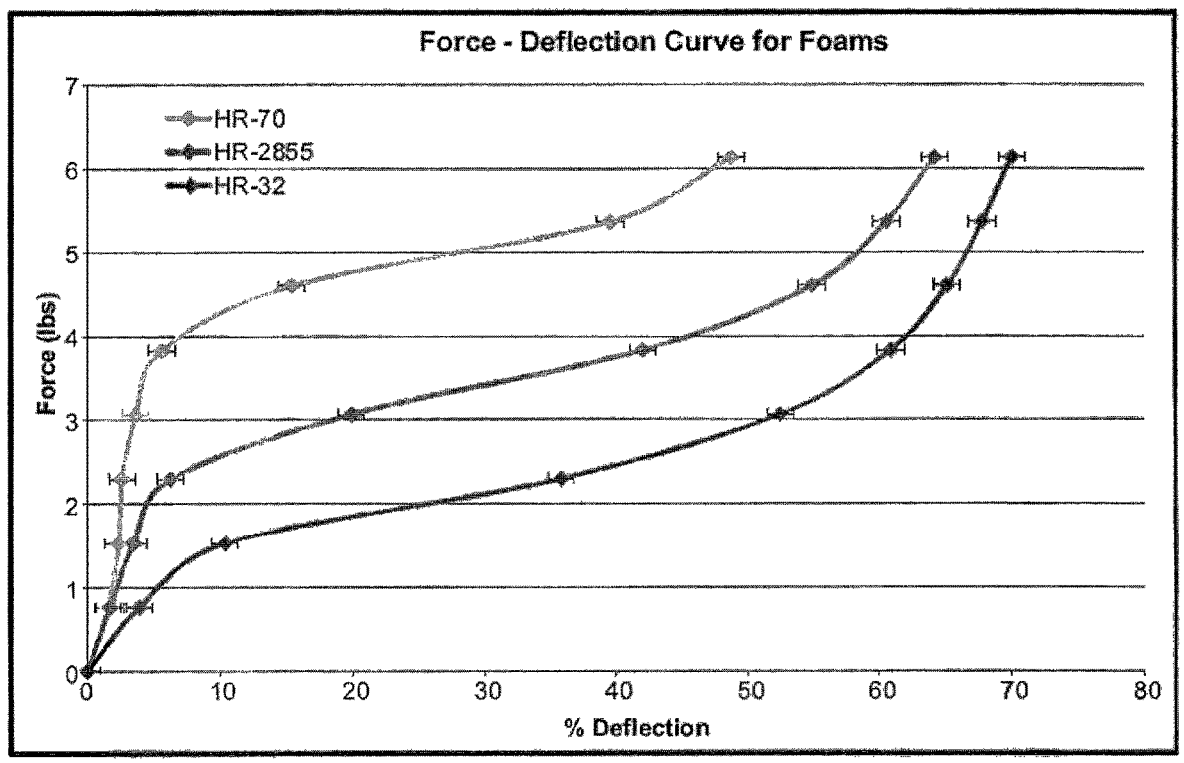
FIG. 14 is a graph illustrating force-deflection curves for conventional foams (HR-70, HR-2855, and HF-32) used in aircraft passenger seat cushion assemblies.
Figure 15:
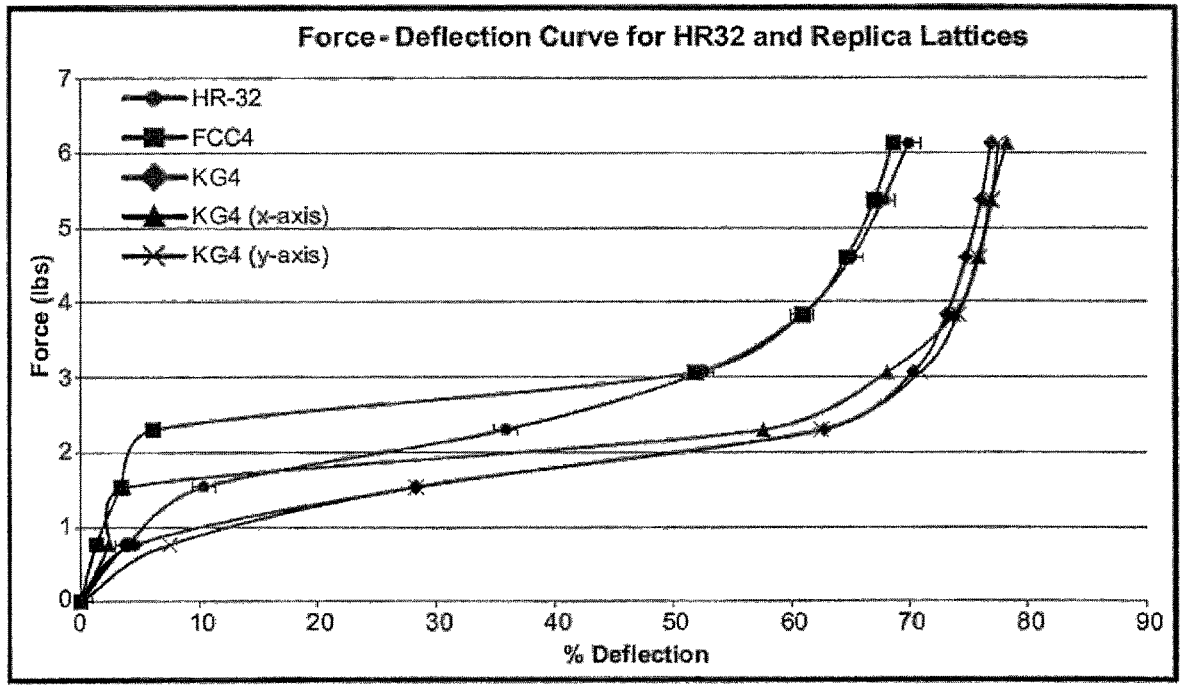
FIG. 15 is a graph illustrating force-deflection curves for the HR-32 foam versus elastomeric lattices formed from interconnected repeating FCC or kagome structures, respectively.
Figure 16:
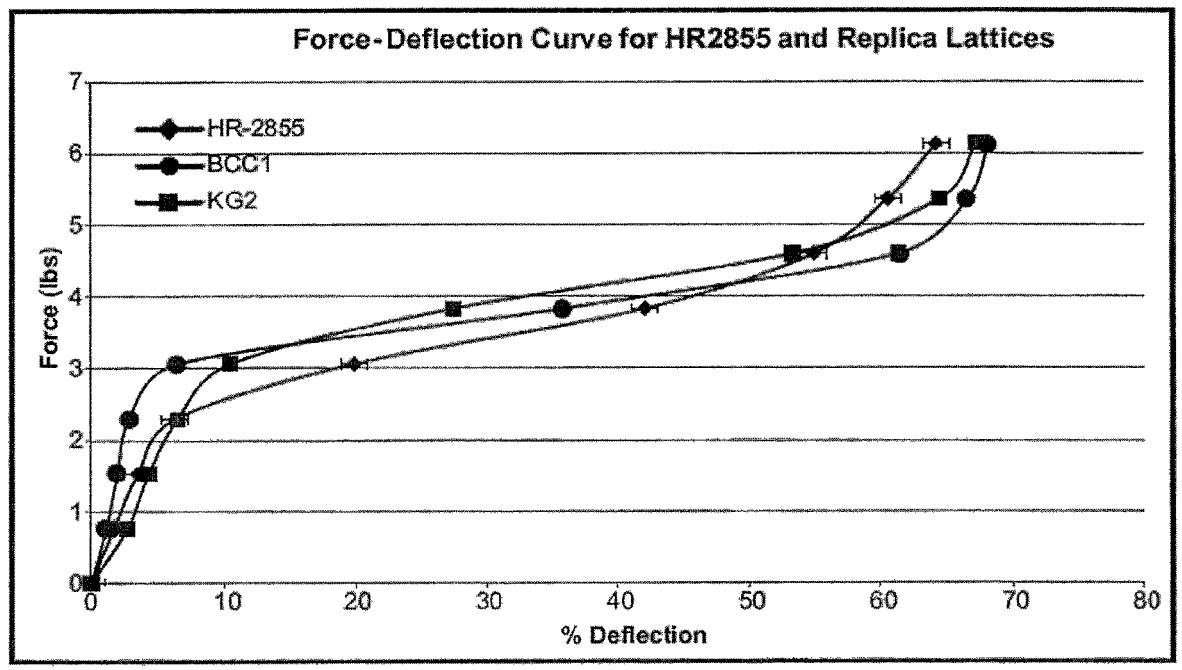
FIG. 16 is a graph illustrating force-deflection curves for the HR-2855 foam versus elastomeric lattices formed from interconnected repeating BCC or kagome structures, respectively.
Figure 17:
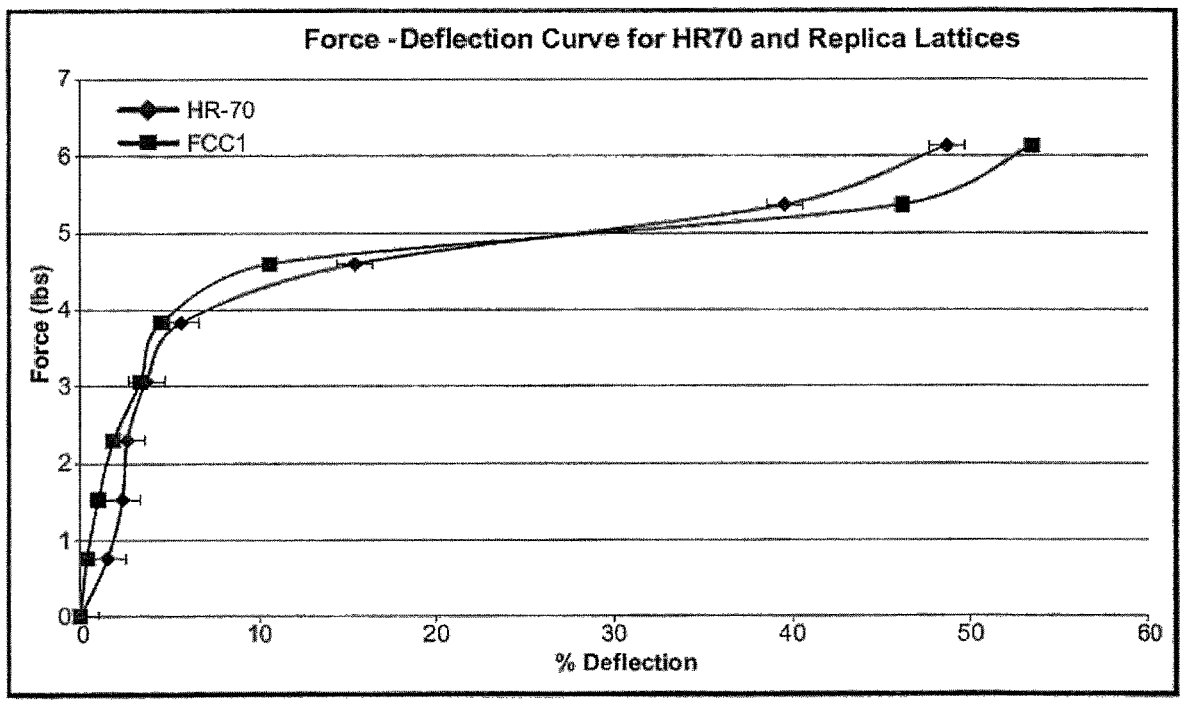
FIG. 17 is a graph illustrating force-deflection curves for the HR-70 foam versus an elastomeric lattice formed from interconnected repeating FCC cube structures.

FIG. 14 shows a force-deflection curve for conventional foams (HR-70, HR-2855, and HF-32) presently used in aircraft seat cushion assemblies, while FIGS. 15-17 show comparative force deflection curves between these conventional foams and the exemplary lattices 64, 72, 80 disclosed herein. As shown in FIGS. 15-17, the exemplary lattices 64, 72, 80 achieve similar, if not identical, percent deflection as compared to conventional solid foams under the same loading conditions, thus evidencing that the exemplary lattices behave or perform similarly, if not identically, to the conventional solid foams when subjected to the same test conditions. FIG. 15 shows a force deflection curve between conventional HR32 foam, a lattice formed from interconnected repeating FCC structures (FCC4 as shown in FIG. 15 had a 1.0 cm unit cell length and interconnected struts of 0.05 cm diameter), and a lattice formed from interconnected repeating kagome structures (KG4 as shown in FIG. 15 had a 0.64 cm unit cell length and interconnected struts of 0.076 cm diameter). FIG. 16 shows a force deflection curve between conventional HR2855 foam, a lattice formed from interconnected repeating BCC structures (BCC1 as shown in FIG. 16 had a 0.5 cm unit cell length and interconnected struts of 0.05 cm diameter), and a lattice formed from interconnected repeating kagome structures (KG2 as shown in FIG. 16 had a 0.5 cm unit cell length and interconnected struts of 0.076 cm diameter). FIG. 17 shows a force deflection curve between conventional HR70 foam and a lattice formed from interconnected repeating FCC structures (FCC1 as shown in FIG. 17 had a 0.64 cm unit cell length and interconnected struts of 0.05 cm diameter).

Figure 18:
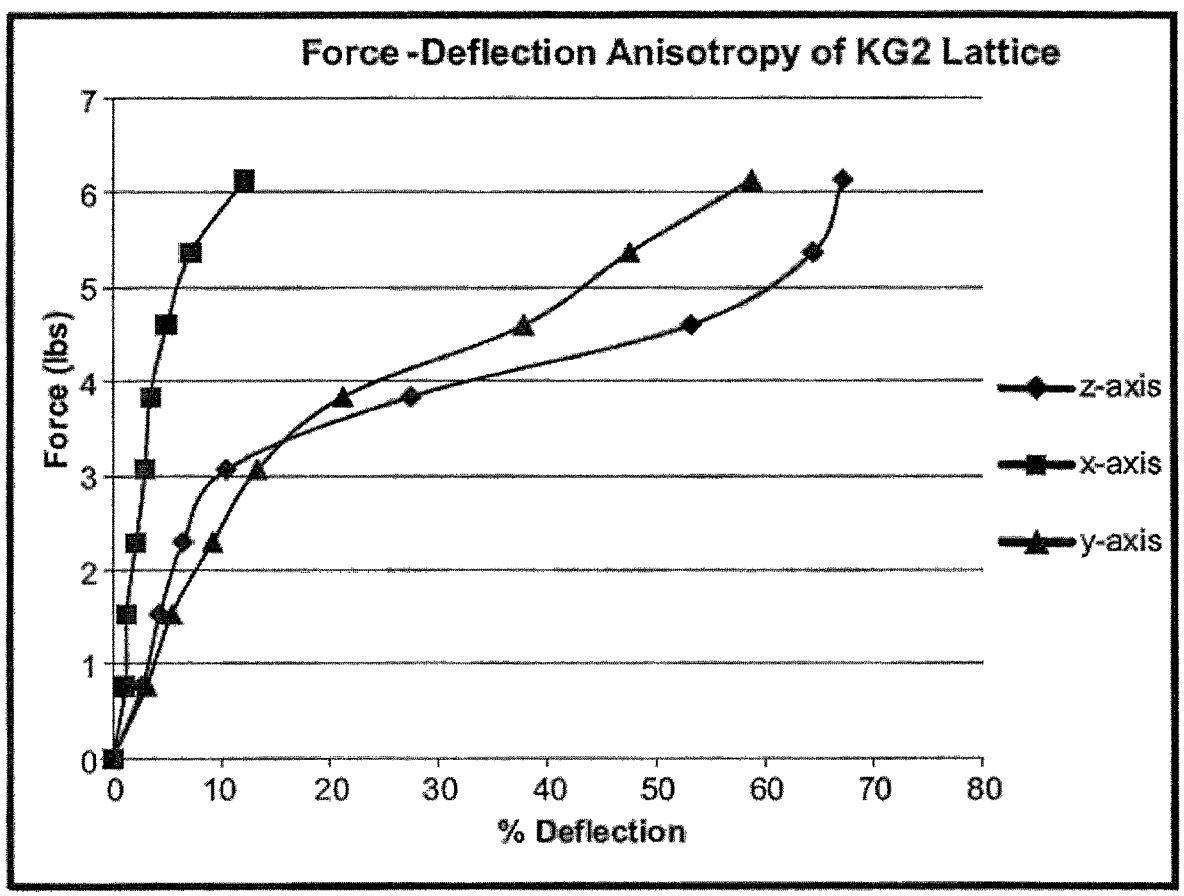
FIG. 18 is a graph illustrating the anisotropic force-deflection of an elastomeric lattice formed from interconnected repeating kagome structures.

In certain aspects, the exemplary lattices 64, 72, 80 have a uniform compressibility profile along at least one axis thereof, and in certain aspects, the lattices have a uniform compressibility throughout all axes. In other aspects, the lattices 64, 72, 80 have a graduated compressibility profile along at least one axis thereof. For example, the lattices can have a graduated compressibility throughout their x-, y- or z-axis (i.e., in a length-wise, width-wise, or thickness-wise direction of the lattice). In other aspects, and as further shown in FIGS. 15 and 18, the lattice can be anisotropic, having greater strength throughout an entire first axial plane as compared to other axial planes thereof. As shown in FIGS. 15 and 18, the lattice 80 formed of interconnected repeating kagome structures 82 exhibited anisotropic characteristics having greater strength throughout the x-axis as compared to the y- or z-axes.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A cushion assembly, comprising:
   a solid foam cushion component comprising at least one of open cell foam and closed cell foam;
   a surface void formed in a top surface of the solid foam cushion component, the surface void including at least one first portion extending from a left lateral extent to a right lateral extent of the solid foam cushion component, and at least one second portion extending from a rear extent to a position rearward of a front extent of the solid foam cushion component; and
   an elastomeric lattice insert positioned in the surface void formed in the top surface of the solid foam cushion component, the elastomeric lattice insert having a unit cuboid structure, and the elastomeric insert including at least one first portion provided in the at least one first portion of the surface void and at least one second portion provided in the at least one second portion of the surface void, the at least one second portion of the elastomeric lattice insert continuous with the first portion of the elastomeric lattice insert.

2. The cushion assembly of claim 1, wherein the elastomeric lattice insert comprises a plurality of stacked and interconnected repeating ones of cuboid structures.

3. The cushion assembly of claim 2, wherein each of the cuboid structures has a unit cell length from 0.4 cm to 1.15 cm.

4. The cushion assembly of claim 2, wherein each of the cuboid structures is identical and is one of a face-centered cube structure, a body-centered cube structure, and a kagome structure.

5. The cushion assembly of claim 1, wherein the elastomeric lattice insert is a polyurethane resin.

6. The cushion assembly of claim 1, wherein the cushion assembly is a component of an aircraft passenger seat, a partition, a monument or an ottoman.

7. An aircraft passenger seat bottom cushion assembly, comprising:
   a solid foam cushion component comprising at least one of open cell foam and closed cell foam;
   a surface void formed in a top surface of the solid foam cushion component, the surface void including at least one first portion extending from a left lateral extent to a right lateral extent of the solid foam cushion component, and at least one second portion extending from a rear extent to a position rearward of a front extent of the solid foam cushion component; and
   an elastomeric lattice insert positioned in the surface void formed in the top surface of the solid foam cushion component, the elastomeric lattice insert having a unit cuboid structure, and the elastomeric insert including at least one first portion provided in the at least one first portion of the surface void and at least one second portion provided in the at least one second portion of the surface void, the at least one second portion of the elastomeric lattice insert continuous with the first portion of the elastomeric lattice insert.

8. The aircraft passenger seat bottom cushion assembly of claim 7, wherein the elastomeric lattice insert comprises a plurality of stacked and interconnected repeating ones of cuboid structures each having a unit cell length from 0.4 cm to 1.15 cm.

9. The aircraft passenger seat bottom cushion assembly of claim 8, wherein each of the cuboid structures is identical and is one of a face-centered cube structure, a body-centered cube structure, and a kagome structure.

* * * * *